United States Patent
Chandrahalim et al.

(10) Patent No.: US 11,204,468 B2
(45) Date of Patent: Dec. 21, 2021

(54) TEMPERATURE-IMMUNE SELF-REFERENCING FABRY-PÉROT CAVITY SENSORS

(71) Applicant: US Gov't as represented by Secretary of Air Force, Wright-Patterson AFB, OH (US)

(72) Inventors: Hengky Chandrahalim, Beavercreek, OH (US); Jonathan Smith, Xenia, OH (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 0 days.

(21) Appl. No.: 17/136,552

(22) Filed: Dec. 29, 2020

(65) Prior Publication Data
US 2021/0116644 A1   Apr. 22, 2021

Related U.S. Application Data

(62) Division of application No. 16/785,718, filed on Feb. 10, 2020, now Pat. No. 10,942,313.

(60) Provisional application No. 62/804,996, filed on Feb. 13, 2019, provisional application No. 62/964,210, filed on Jan. 22, 2020.

(51) Int. Cl.
| | | |
|---|---|---|
| *G01J 3/02* | (2006.01) | |
| *G01J 3/26* | (2006.01) | |
| *G02B 6/293* | (2006.01) | |
| *G01N 21/27* | (2006.01) | |
| *G02B 6/02* | (2006.01) | |
| *G02B 6/12* | (2006.01) | |
| *G01N 21/09* | (2006.01) | |
| *G01N 21/85* | (2006.01) | |
| *B82Y 20/00* | (2011.01) | |

(Continued)

(52) U.S. Cl.
CPC ........ *G02B 6/29359* (2013.01); *G01J 3/0218* (2013.01); *G01J 3/26* (2013.01); *G01N 21/274* (2013.01); *G02B 6/29358* (2013.01); *B82Y 15/00* (2013.01); *B82Y 20/00* (2013.01); *G01N 21/09* (2013.01); *G01N 21/8507* (2013.01); *G02B 6/02033* (2013.01); *G02B 6/3624* (2013.01); *G02B 2006/12159* (2013.01)

(58) Field of Classification Search
CPC ........ B82Y 15/00; B82Y 20/00; G01J 3/0218; G01J 3/26; G01N 21/09; G01N 21/274; G01N 21/8507; G02B 6/02033; G02B 6/29358; G02B 6/29359; G02B 6/3624; G02B 2006/12159
See application file for complete search history.

(56) References Cited

U.S. PATENT DOCUMENTS

| | | | | |
|---|---|---|---|---|
| 8,253,945 B2* | 8/2012 | Gahan | ..... | G01D 5/268 |
| | | | | 356/480 |
| 10,359,316 B1* | 7/2019 | Han | ..... | G01J 5/0887 |
| 10,725,373 B1* | 7/2020 | Kumar | ..... | G03F 7/0002 |

* cited by examiner

*Primary Examiner* — Ryan A Lepisto
(74) *Attorney, Agent, or Firm* — AFMCLO/JAZ; David E. Franklin

(57) ABSTRACT

A passive microscopic Fabry-Pérot Interferometer (FPI) sensor includes an optical fiber a three-dimensional microscopic optical structure formed on a cleaved tip of an optical fighter that reflects a light signal back through the optical fiber. The reflected light is altered by refractive index changes in the three-dimensional structure that is subject to at least one of: (i) thermal radiation; and (ii) volatile organic compounds.

4 Claims, 12 Drawing Sheets

(51) Int. Cl.
*B82Y 15/00* (2011.01)
*G02B 6/36* (2006.01)

US 11,204,468 B2

TEMPERATURE-IMMUNE SELF-REFERENCING FABRY-PÉROT CAVITY SENSORS

CROSS-REFERENCE TO RELATED APPLICATIONS

This application claims the benefit of priority under 35 U.S.C. § 120 as a continuation to U.S. patent application Ser. No. 16/785,718 filed on 10 Feb. 2020 and entitled "Temperature-immune self-referencing Fabry-Pérot cavity sensors," which in turn claims the benefit of priority under 35 U.S.C. § 119(e) to U.S. Provisional Application Ser. No. 62/804,996 entitled "Temperature-immune self-referencing Fabry-Pérot cavity sensors," filed 13 Feb. 2019, the contents of which are incorporated herein by reference in their entirety. This application claims the benefit of priority under 35 U.S.C. § 119(e) to U.S. Provisional Application Ser. No. 62/964,210 entitled "Temperature-immune self-referencing Fabry-Pérot cavity sensors," filed 22 Jan. 2020, the contents of which are incorporated herein by reference in their entirety.

This application is related to another application filed on the same day under 35 U.S.C. § 120 as a second continuation to U.S. patent application Ser. No. 16/785,718 and is entitled "Method of making a temperature-immune self-referencing Fabry-Pérot cavity sensors".

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to optical sensors and methods of fabricating optical sensors.

2. Description of the Related Art

The Fabry-Perót (FP) cavity is an important optical component with many applications. A basic FP cavity consists of two parallel reflective surfaces separated by a chosen distance and encapsulating air, vacuum, or another media with refractive index (RI) n. Multiple beam interference between the two surfaces causes transmission through the cavity to peak at specific wavelengths of maximum coherent interference, while others are reflected. At the micron scale, this enables the FP cavity to propagate a small number of optical modes compared to other optical cavities such as ring resonators, photonic crystals, and distributed feedback gratings. [1] The FP cavity can also achieve large quality factors, with values as high as 105 reported. [2] It is easily accessible to the environment and, unlike devices such as the ring resonator, the FP cavity does not require the substance inside the cavity to have a different RI than the substance outside the cavity. [3] While often beneficial, the open nature of the FP cavity means it lacks lateral confinement, and loses some resonant light off the edges of the mirrors. Flat FP cavities are highly sensitive to misalignment, and any misalignment, even one of several degrees, between the mirrors will significantly lower a cavity's quality factor. [1] One popular way to overcome this sensitivity is by using one or more curved mirrors, [3-5] although this often increases the complexity of fabrication.

Many advantages of the FP cavity have made it a key component to a myriad of applications. When used to form a laser cavity, a variety of exotic gain media have recently been explored including biological tissues, [6] silicon nanowires, [7] and optical fluids. [1, 3] Miniaturized tunable lasers [8, 9] and tunable optical filters [10] have also been realized by integrating an FP cavity with microelectromechanical systems (MEMS). The accessibility of the cavity has also made it a powerful tool for spectroscopy. It has been used in on-chip microfluidics, [11] human breath analysis, [12] interrogation of living cells, [13] and compact imaging spectrometers. [14] The FP cavity is also set to play a key role in the emerging field of quantum computing, with cavity quantum electrodynamics (CQED) at the forefront of many advances. It has been demonstrated in a photon emission source, [15, 4] in strong coupling to a trapped atom, [16] and in frequency splitting of polarization eigenmodes. [17, 18]

The difference between two resonant wavelengths in a FP cavity, the cavity's free spectral range (FSR), is determined by the distance between the mirrors and the refractive index of the medium inside the cavity. Sensors can detect phenomena that affect these factors, and have found many applications to include sensing gravitational waves, [19] acceleration, [20] pressure, [21] liquid RI, [21] temperature, [22] force [24], and even gas composition. [24]

Optical fibers present a powerful platform to both form and interrogate FP cavities due to their small form factor, low-loss, and well-behaved transverse optical mode structure. Promising applications for fiber integrated FP cavities include optofluidic in-fiber lasers [25, 26] and miniaturized high sensitivity sensors [21-24]. Poor lateral confinement and misalignment sensitivity continue to plague fiber based FP cavity devices, and represent significant design challenges. The fiber itself is also an exotic substrate due to its geometry, which renders it incompatible with many planar microfabrication processes. A variety of techniques have been explored to overcome these challenges and create FP cavities on optical fibers. One device was fabricated by splicing a segment of hollow-core optical fiber (HOF) to a single-mode fiber (SMF), and capping the HOF with a segment of photonic crystal fiber (PFC). [24] While this design can interrogate gasses, liquids would have difficulty reaching the cavity through the small openings in the PFC. Splicing various types of optical fibers also requires precise alignment and may be difficult to repeat reliably. Another successful on-fiber FP resonator was made by ion milling a cavity into a tapered SMF probe. [22] While the environment is easily accessed by this cavity, the fabrication process is complex and laborious, involving $CO_2$ laser pulling and metal deposition before the ion milling. Another group used the photo-active polymer SU-8 to construct a suspended polymer cavity on a fiber tip. [21] The resulting device can interrogate liquid or gas, and the fabrication process enables two-dimensional (2-D) freedom with a digital mirror. But this process is also relatively complicated, requiring a spray coat, bake, and UV exposure for each individual layer. This also limits the 3-D structures that can be realistically built.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
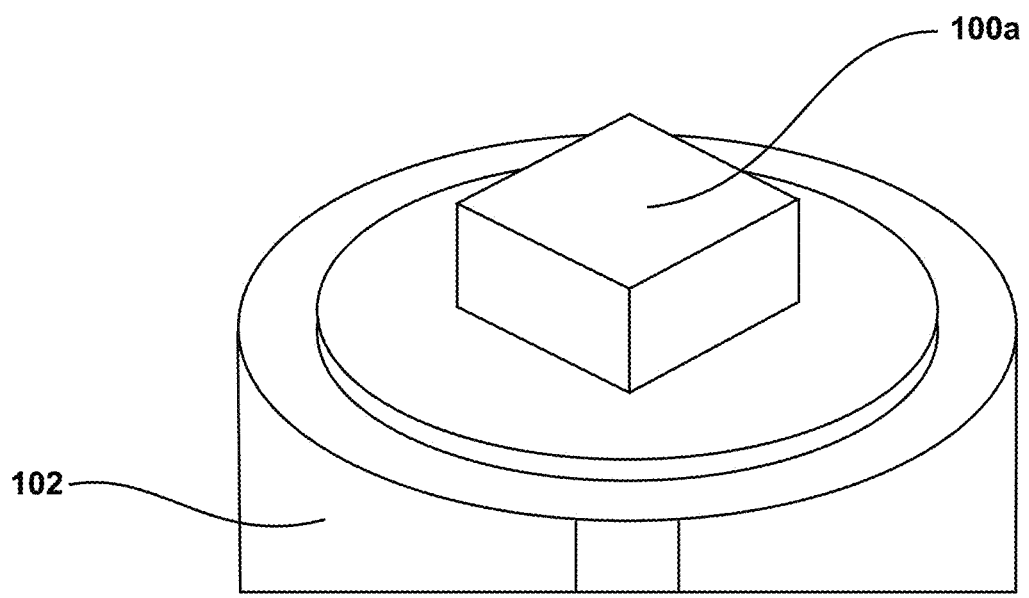
FIG. 1A is a top isometric projection of a single-cavity FP sensor on a cleaved end of an optical fiber, according to one or more embodiments.

According to aspects of the present disclosure, a passive microscopic Fabry-Perot Interferometer (FPI) sensor includes an optical fiber a three-dimensional microscopic optical structure formed on a cleaved tip of an optical fighter that reflects a light signal back through the optical fiber. The reflected light is altered by refractive index changes in the three-dimensional structure that is subject to at least one of: (i) thermal radiation; and (ii) volatile organic compounds.

According to aspects of the present disclosure, a method is provided for fabricating a passive optical sensor on a tip of an optical fiber. In one or more embodiments, the method includes perpendicularly cleaving a tip of an optical fiber. The method includes mounting the tip of the optical fiber in a specimen holder of a photosensitive polymer three-dimensional micromachining machine. The method includes forming a three-dimensional microscopic optical structure on the tip that reflects a light signal back through the optical fiber. The reflected light is altered by refractive index changes in the three-dimensional structure that is subject to at least one of: (i) thermal radiation; and (ii) volatile organic compounds.

The present disclosure introduces an innovative fabrication process that greatly simplifies the realization of complex geometries on virtually any substrate. Three-dimensional (3-D) Fabry-Pérot cavities are sculpted on fiber tips using a multiphoton polymerization process. In particular, 3-D Fabry-Pérot (FP) cavities are fabricated directly onto cleaved ends of low-loss optical fibers by a two-photon polymerization process. This fabrication technique is quick, simple, and inexpensive compared to planar microfabrication processes, which enables rapid prototyping and the ability to adapt to new requirements. These devices also utilize true 3-D design freedom, facilitating the realization of microscale optical elements with challenging geometries. Three different device types were fabricated and evaluated: an unreleased single-cavity device, a released dual-cavity device, and a released hemispherical mirror dual-cavity device. Each iteration improved the quality of the FP cavity's reflection spectrum. The unreleased device demonstrated an extinction ratio around 1.90, the released device achieved 61, and the hemispherical device achieved 253, providing a strong signal to observe changes in the free spectral range (FSR) of the device's reflection response. The reflectance of the photopolymer was also estimated to be between 0.2 and 0.3 over the spectrum of interest. The dual-cavity devices include both an open cavity, which can interact with an interstitial medium, and a second solid cavity, which provides a static reference reflection. The hemispherical dual-cavity device further improves the quality of the reflection signal with a more consistent resonance, and reduced sensitivity to misalignment. These advanced features, which are very challenging to realize with traditional planar microfabrication techniques, are fabricated in a single patterning step.

Figure 1B:
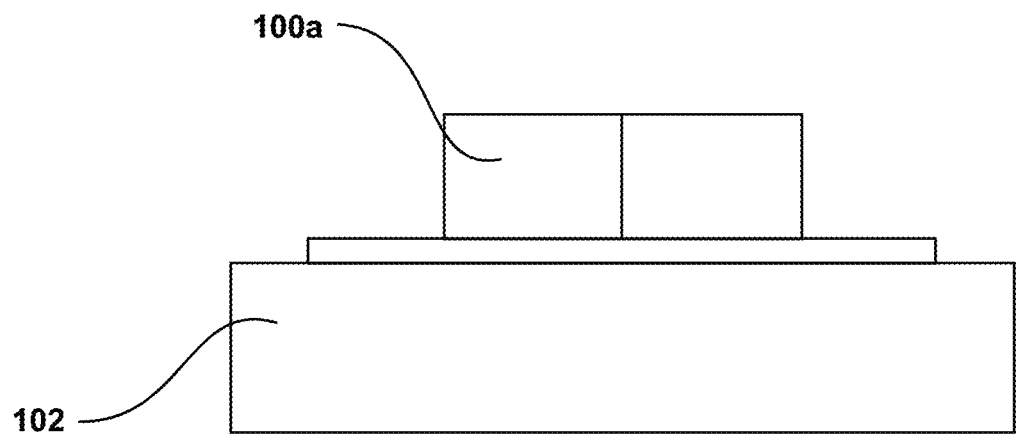
FIG. 1B is a side view of the single-cavity FP sensor on a cleaved end of the optical fiber of FIG. 1A, according to one or more embodiments.
Figure 1C:
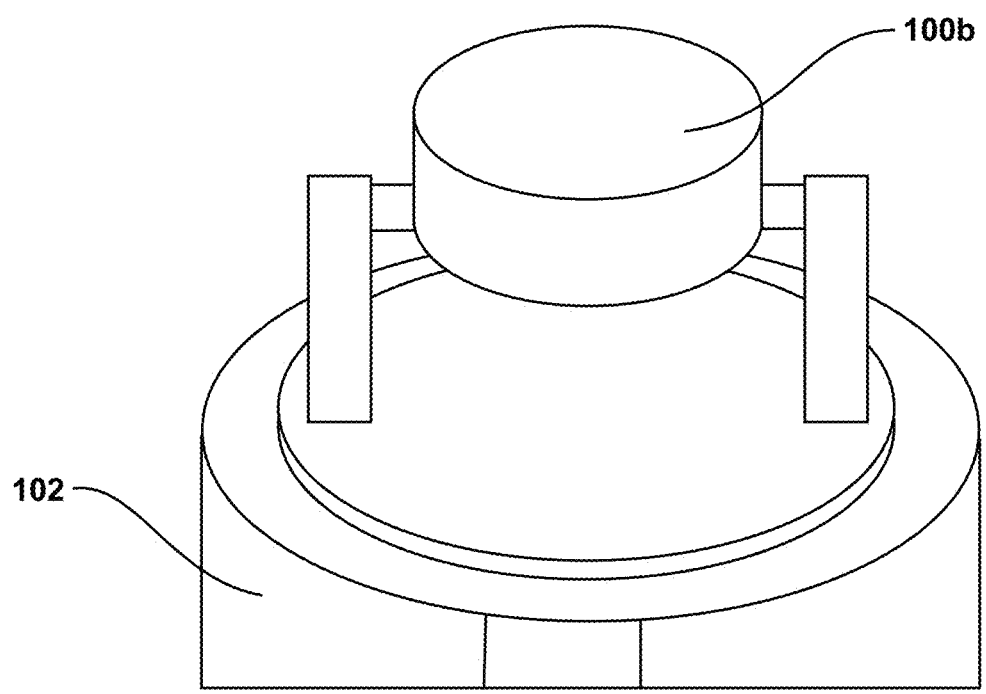
FIG. 1C is a top isometric projection of a released dual-cavity FP sensor on a cleaved end of an optical fiber, according to one or more embodiments.
Figure 1D:
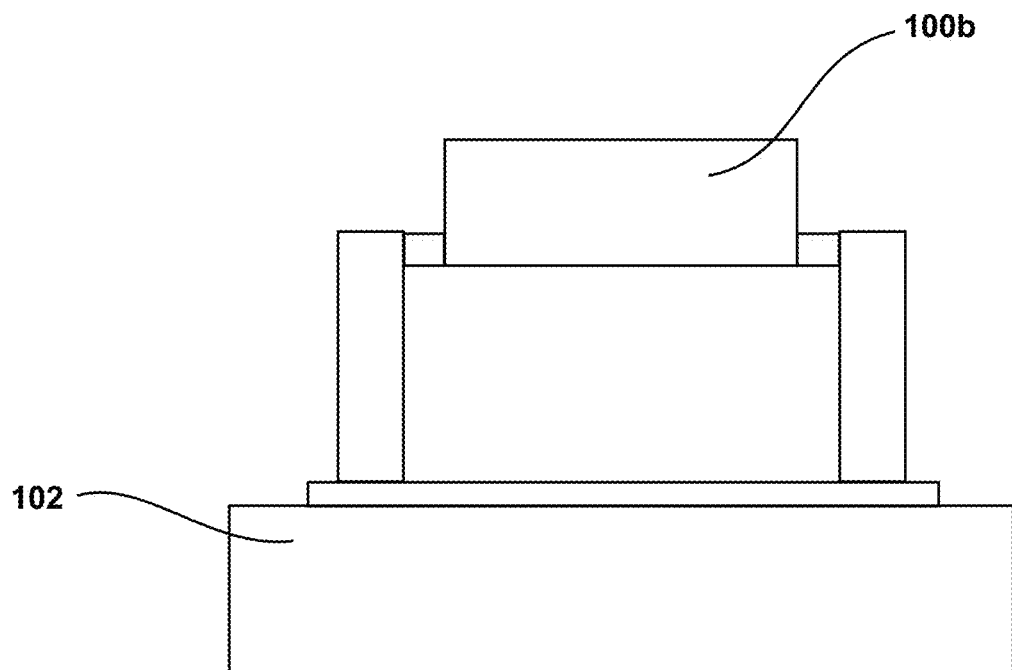
FIG. 1D is a side view of the released dual-cavity FP sensor on a cleaved end of the optical fiber of FIG. 1C, according to one or more embodiments.
Figure 1E:
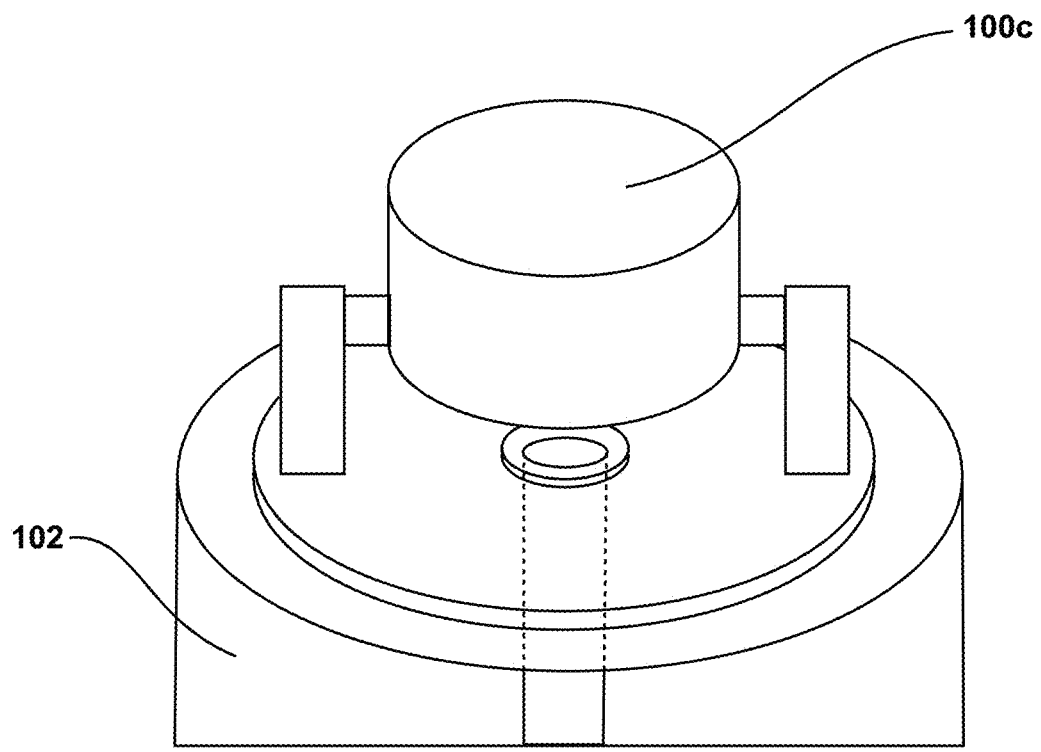
FIG. 1E is a top isometric projection of a released hemispherical dual-cavity FP sensor on a cleaved end of an optical fiber, according to one or more embodiments.
Figure 1F:
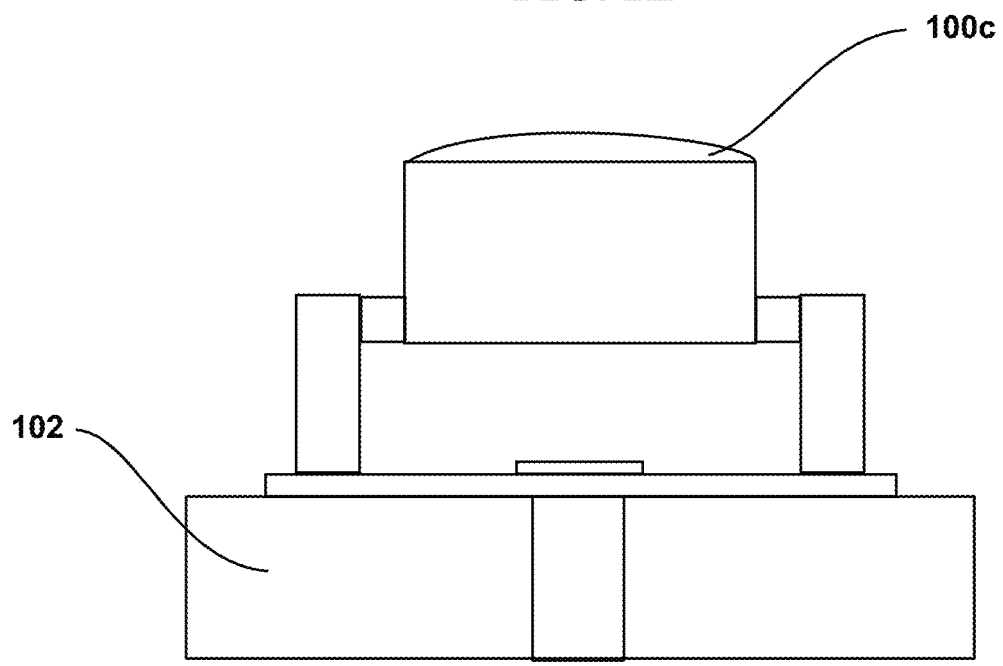
FIG. 1F is a side view of the released hemispherical dual-cavity FP sensor on a cleaved end of the optical fiber of FIG. 1E, according to one or more embodiments.

FIG. 1A is a top isometric projection of a single-cavity FP sensor 100a on a cleaved end (fiber tip 104) of an optical fiber 102. FIG. 1B is a side view of the single-cavity FP sensor 100a on the cleaved end (fiber tip 104) of the optical fiber 102. FIG. 1C is a top isometric projection of a released dual-cavity FP sensor 100b on a cleaved end (fiber tip 104) of an optical fiber 102. FIG. 1D is a side view of the released dual-cavity FP sensor 100b on a cleaved end (fiber tip 104) of the optical fiber 102. FIG. 1E is a top isometric projection of a released hemispherical dual-cavity FP sensor 100c on a cleaved end (fiber tip 104) of an optical fiber 102. FIG. 1F is a side view of the released hemispherical dual-cavity FP sensor 100c on a cleaved end (fiber tip 104) of the optical fiber 102.

The devices presented in this work were fabricated using a simple process that requires only mounting the fiber into a two-photon polymerization system from Nanoscribe GmbH and chemical developing [27]. This technique enabled us to realize 3-D free-form geometries—a feat which cannot be accomplished using other methods on this spatial scale. This enables the use of nonplanar components to improve device performance, such as in our use of curved mirrors to create a hemispherical FP cavity to significantly reduce misalignment susceptibility. Our method can create these 3-D components with submicron precision. The three on-fiber FP cavity designs that were fabricated and tested are depicted in FIGS. 1A-1F. The hemispherical device achieved the greatest extinction ratio of the three designs tested, and highlights the power of the design freedom afforded by this process. The unreleased device demonstrated an extinction ratio around 1.90, the released device achieved 61, and the hemispherical device achieved 253, providing a strong signal to observe changes in the FSR of the device. We were also able to extract the reflectance of the photopolymer by fitting an Airy distribution to the reflection spectrum. This yielded a reflectance between 0.2 and 0.3 for the polymerized resin. The dual-cavity devices allow for interrogation of an interstitial medium in the first, open cavity while simultaneously referencing the static reflection spectrum of the second, solid-polymer cavity. These advanced features, which are very difficult or impossible to achieve with traditional planar microfabrication techniques, were fabricated in a single patterning step. The speed and simplicity of fabrication enables rapid prototyping and an iterative design processes to realize complicated devices and advanced features.

Figure 2A:
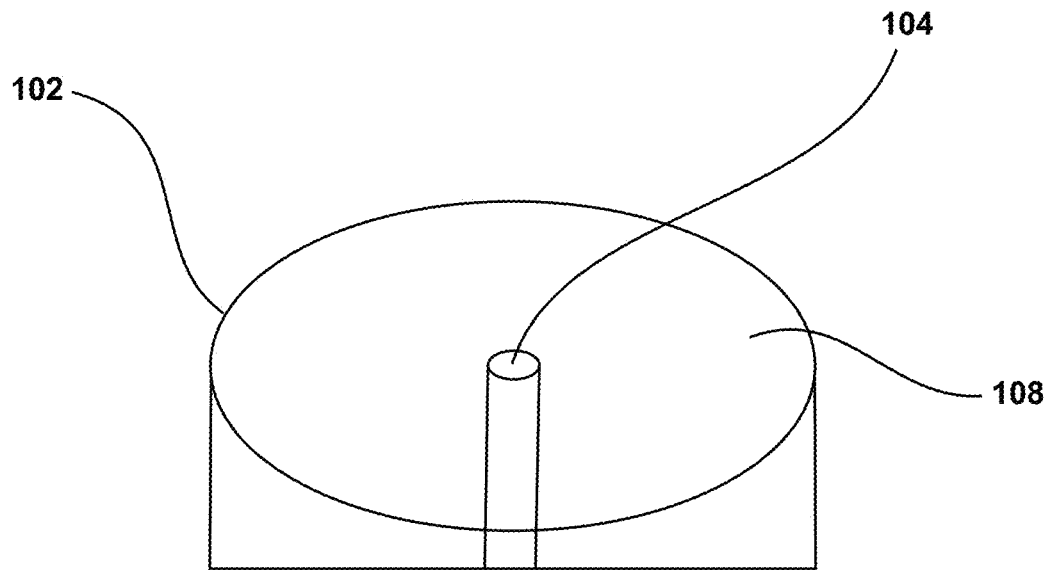
FIG. 2A depicts a top isometric projection of a fiber tip that was properly cleaned, cleaved, and mounted on a laser machining station, according to one or more embodiments.

Fabrication Process: FIGS. 2A-2D depict a sequential example of maskless two-photon polymerization microfabrication process flow. In the illustrative embodiments, devices fabricated in this work were centered on the fiber core 108. FIG. 2A depicts a top isometric projection of a fiber tip 104 of an optical fiber 102 that was properly cleaned, cleaved, and mounted on a laser machining station. First the optical fiber was stripped, cleaned, and cleaved to create a flat platform with access to the core of the fiber, as illustrated in FIG. 2A. The optical fiber 102 used in this work was F-SM1500-9/125-P fiber from Newport Corporation. The cleaved optical fiber 102 was secured into a Newport FPH-S fiber chuck and mounted into a custom jig that aligns a cleaved fiber face 108 orthogonally to the laser aperture of the Nanoscribe GmbH system.

Figure 2B:
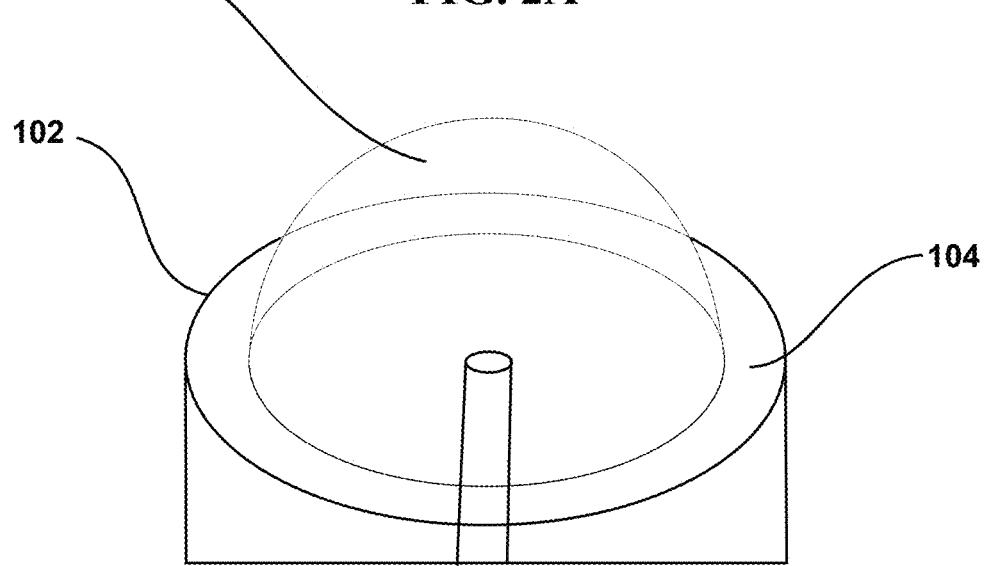
FIG. 2B depicts a top isometric projection of photosensitive resin that was deposited on the fiber tip of FIG. 2A, according to one or more embodiments.
Figure 2C:
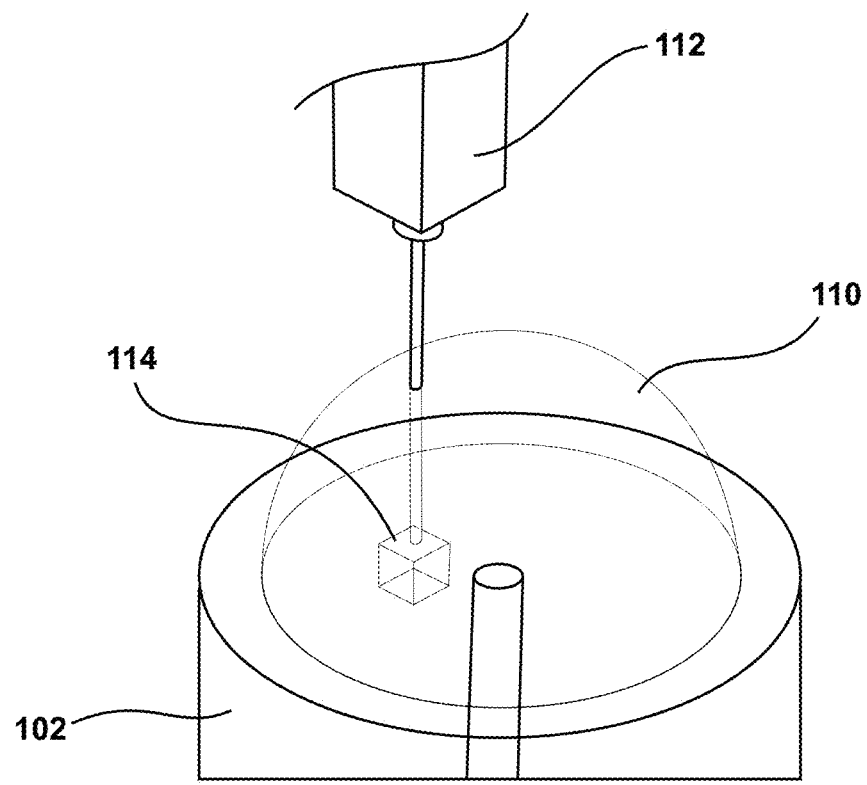
FIG. 2C depicts a top isometric projection of a femtosecond laser that was then focused in the photosensitive IP-DIP resin of FIG. 2B to polymerize portions of resin layer by layer to form a solidified structure, according to one or more embodiments.

FIG. 2B depicts a top isometric projection of photosensitive IP-DIP resin 110 (marketed by Nanoscribe GmbH) that was deposited on the fiber tip 104. The uncured, liquid photoactive polymer resin (Nanoscribe's IP-DIP) was deposited onto the cleaved fiber face, as shown in FIG. 2B. The resin can be deposited in any thickness or shape that encloses the desired build volume. Thus, several traditional photoresist deposition steps, such as spin-coating and pre-baking, were eliminated. FIG. 2C depicts a top isometric projection of a femtosecond laser 112 that was then focused in the photosensitive IP-DIP resin 110 of FIG. 2B to polymerize portions of resin 110 layer by layer to form a solidified structure 114. Once mounted, the resin 110 was selectively exposed to ultra-short laser pulses with a wavelength of 780 nm, a repetition rate of 80 MHz, and a pulse duration of 120 fs by the Nanoscribe GmbH laser writing system. The resin 110 only solidified when subjected to the nonlinear optical process of two-photon polymerization. Simultaneous absorption of two photons was necessary to polymerize the resin, which only occurred in a small portion of the focused laser beam. [28] The volume of the beam initiating two-photon polymerization can be scaled to offer a balance of resolution and speed. The minimum volume for this system was 150 nm wide by 150 nm long by 200 nm tall. This focal point was scanned through the resin according to a computer-aided design (CAD) file to solidify the desired structure. This system has a maximum scan speed of 2 mm/s, but small features and optical quality curvatures require significantly slower scan speeds. The FP cavity devices in this work were fully polymerized in less than 15 minutes. The x-y aspects of each layer were controlled by a galvanometer, while the z direction was controlled with a piezoelectric actuator.

Figure 2D:
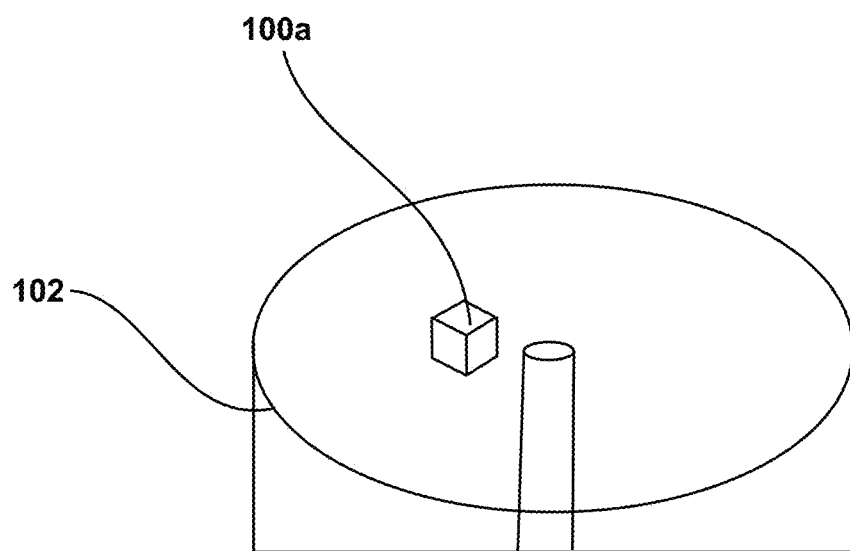
FIG. 2D depicts a top isometric projection of the fiber tip after a chemical developer was used to remove non-polymerized resin, releasing the solidified structure, according to one or more embodiments.

FIG. 2D depicts a top isometric projection of the fiber tip 104 after a chemical developer was used to remove non-polymerized resin 110 (FIG. 2C), releasing the solidified structure 114. In particular, once the desired volume had been polymerized, the fiber tip 104 was submerged in propylene glycol methyl ether acetate (PGMEA) for 20 min. This common solvent removed the unexposed resin, releasing the polymerized structure. Finally, the fiber tip 104 was submerged in isopropanol (IPA) for another 20 min to clean off the PGMEA. The result was the desired 3-D structure (single-cavity FP sensor 100a) of polymerized resin.

While significantly faster than other fabrication methods, the stepwise nature of the laser scanning process introduced striations into the surface finish of the devices. Planar FP cavities require a flat reflective surface, and hemispherical FP cavities require a smooth spherical mirror, and it was not known if the devices created here had an optical-quality surface finish. Also of concern, features with a height equal to one half or one quarter of the wavelength of interest could introduce destructive interference and create an antireflective surface. To analyze the surface finish, we fabricated a sample structure onto an Indium-Tin-Oxide (ITO) coated glass slide to mount into an atomic force microscope (AFM).

Figure 3A:
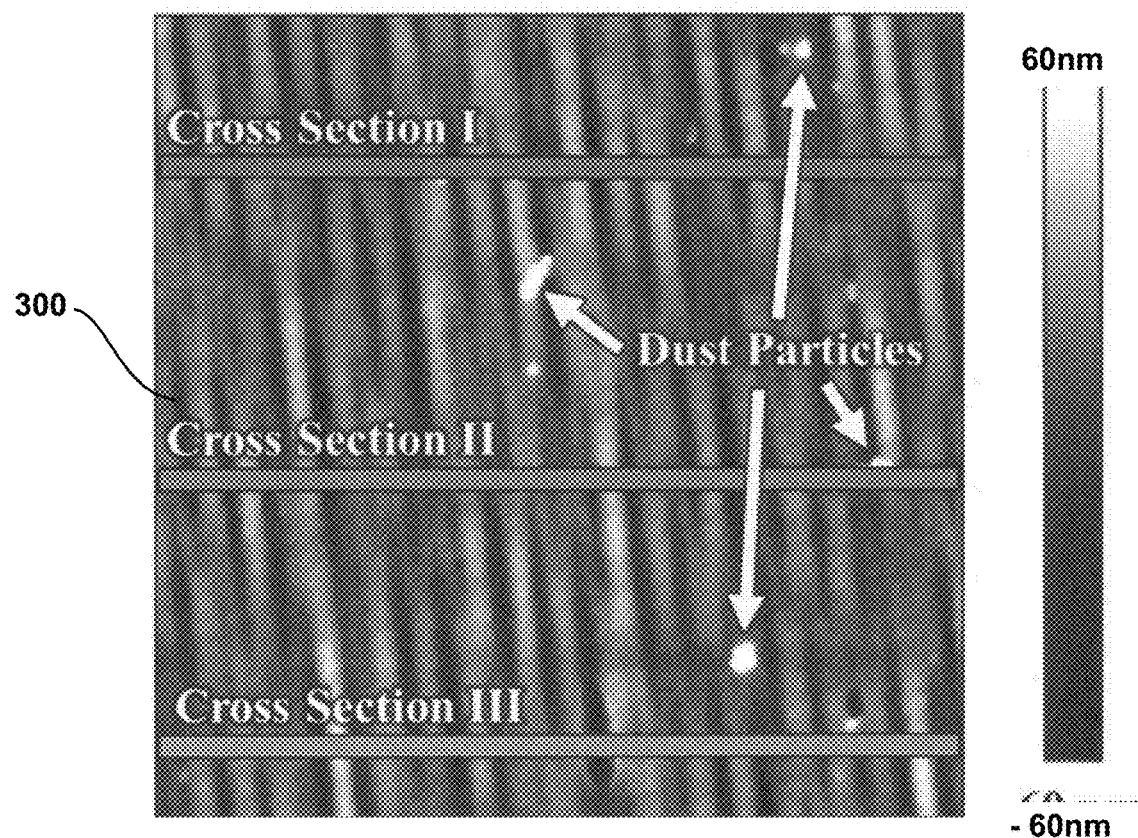
FIG. 3A depicts a top view of an AFM of the surface interrogated, according to one or more embodiments.
Figure 3B:
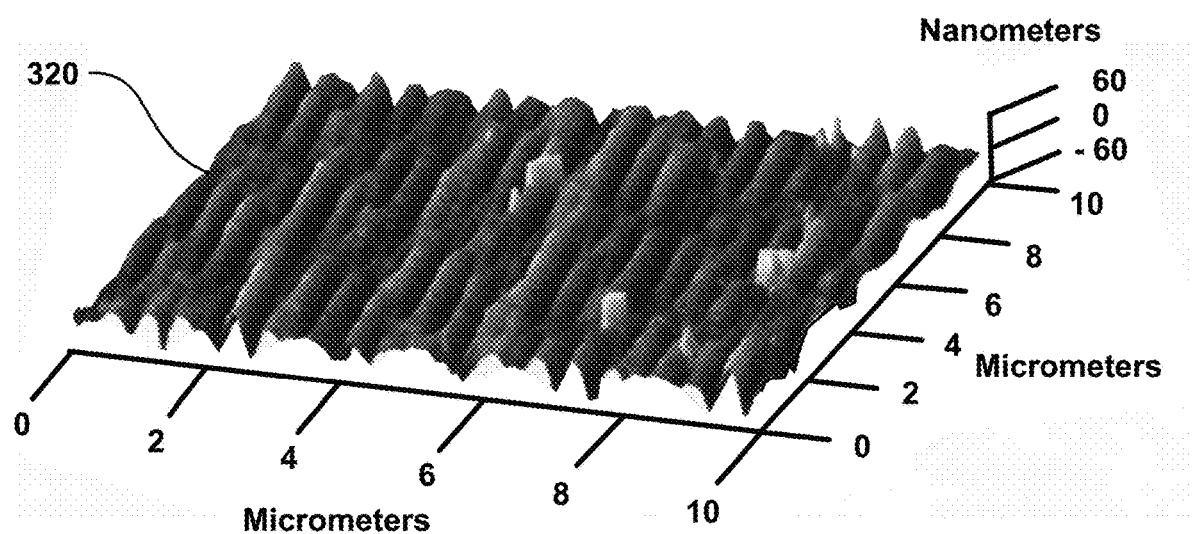
FIG. 3B depicts a 3-D rendering of the AFM scan of FIG. 3A showing surface topography, according to one or more embodiments.
Figure 3C:
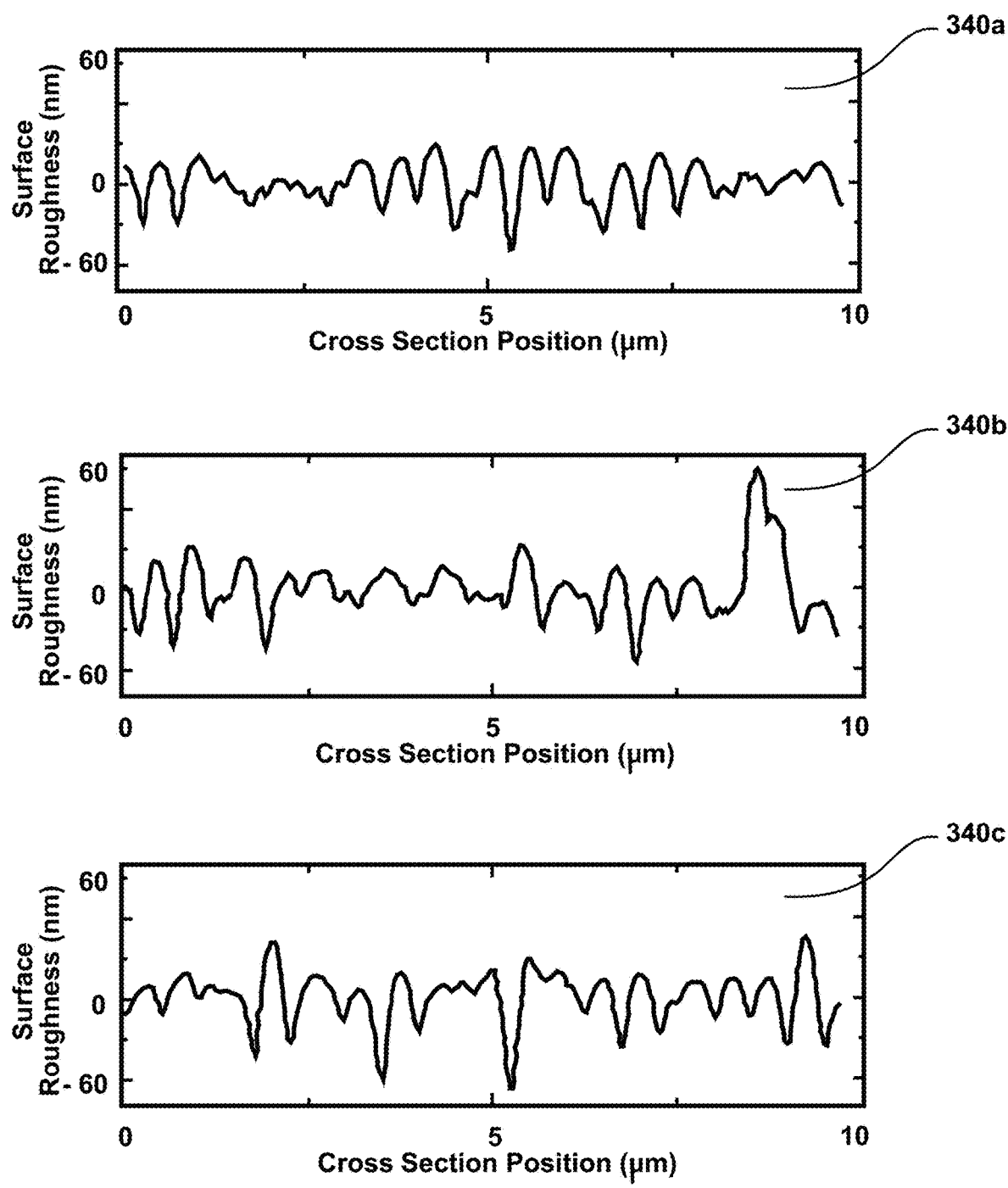
FIG. 3C depicts three cross sections I-III throughout the surface of FIG. 3A to quantify roughness, according to one or more embodiments.

FIGS. 3A-3C depict surface analysis of an optical flat 300 fabricated with two-photon polymerization by ultra-short laser pulses. FIG. 3A depicts a top view of an AFM of the surface interrogated. FIG. 3B depicts a 3-D rendering 320 of the AFM scan of FIG. 3A showing surface topography. FIG. 3C depicts three cross sections I-III 340a-340c throughout the surface of FIG. 3A to quantify roughness. The expected striations from the scanning process were present at regular intervals. The surface finish, including these features, was found to have a roughness of approximately 60 nm, with the peak to peak difference averaging 120 nm. This work focused on using wavelengths in the 1460-1640 nm range to probe the FP structures fabricated on the fiber ends. Therefore, the fabrication variations in surface roughness are significantly smaller than the wavelengths of interest, and far less than one half or one quarter wavelength interval which would lead to their own interference effects. In fact, the structures fabricated by this process were confirmed to have a roughness below $\lambda/10$ which is consistent with an optical quality surface finish in the wavelengths of interest.

Figure 4:
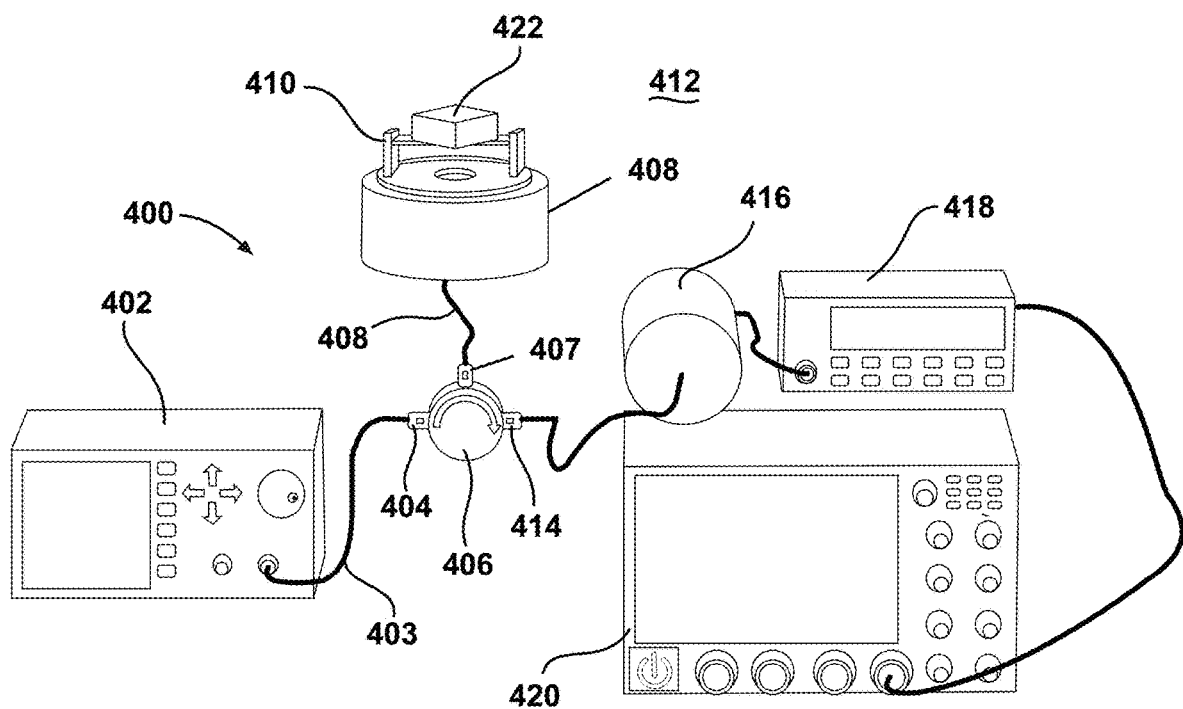
FIG. 4 depicts a diagram of an experimental setup used to characterize the reflection spectrum of each device in air at room temperature, according to one or more embodiments.

FIG. 4 depicts a diagram of an experimental setup 400 used to characterize the reflection spectrum of each device in air at room temperature. Experimental setup 400 includes tunable laser source 402 (Agilent 81600B) that outputs a laser source via laser input fiber 403 to a first port 404 of optical circulator 406. Tunable laser source 402 was swept from 1463 nm to 1634 nm during each measurement. The laser source is directed from second port 707 of optical circulator 406 through SM optical fiber ("device fiber") 408 to fiber tip device 410 and exposed to atmosphere 412. In particular, device fiber 408 was fusion spliced to another SMF terminating in an FC/APC connector using a Fujikura FSM-100P ARC Master fiber splicer. Reflections from fiber tip device 410 return through SM optical fiber 408 to second port 407 of optical circulator 406 to third port 414 of optical circulator 406 for detection by photo detector 416. Power meter 418 measures results from photo detector 416 for presenting on digital oscilloscope 420. In particular, the third port 414 of the optical circulator 406 was connected to a Newport universal fiber optic detector. This photodetector interfaced with a Newport 1830-C optical power meter, whose output was visualized and stored using a Keysight D509254A digital storage oscilloscope.

The optical circulator 406 and laser input fiber 403 were polarization maintaining, while the device fiber 408 was not. Therefore the polarization was adjusted to maximize reflected intensity at 1550 nm at the start of each measurement. The tunable laser source 402 was then swept from 1463 nm to 1634 nm and the reflection from the FP cavity 422 of the fiber tip device 410 was isolated by the optical circulator 406. The photodetector and power meter transduced the optical power into a voltage which was monitored and recorded by the oscilloscope. Optical resonances within the FP cavity caused a peak in transmission through the FP cavity which was observed as a dip in reflection intensity. This technique allowed the devices to be used remotely, with the bulky input and measurement components geographically separated from the device.

The reflection spectrum of each device was measured in volts read by the oscilloscope at a given wavelength. The extinction ratio reported for each device was calculated using the ratio between the mean of the four lowest reflection dips and the mean of the four highest reflection peaks. The mean of the four highest peaks is referred to as the high reflection intensity, and the mean of the four lowest dips is referred to as the low reflection intensity. Assuming incident light normal to each cavity, the theoretical FSR of a FP cavity is calculated according to $\Delta\lambda_{FSR}=\lambda_0^2/2nl$, where $\lambda_0$ is the central wavelength of the transmission peak (and reflection dip), n is the RI of the cavity medium, and nn is the length of the cavity. For our devices, we considered a hypothetical transmission peak at 1550 nm, an IP-DIP refractive index of 1.504, and a refractive index of 1 in air. The RI was calculated by interpolating data provided by Nanoscribe, and 1550 nm is a common telecom wavelength in the middle of our laser's bandwidth. All calculations assume room temperature.

The transmission through a FP resonator can be modelled by the Airy distribution, which calculates the internal resonance enhancement factor for light of a given wavelength based on the physical properties of the cavity. [29] The generic Airy distribution for two mirrors of equal reflectance is calculated with, $A=[(1-R)^2+4R\sin^2(\phi)]^{-1}$, where R is the reflectance of the mirrors, and $2\phi$ is the single-pass phase shift between the mirrors. [29] This is calculated with, $2\phi'=2\pi(\lambda-\lambda_0)/\Delta\lambda_{FSR}\approx 2\pi\lambda/\Delta\lambda_{FSR}$. The intensity of light reflected back from the cavity, as was measured in this work, is inversely proportional to the transmission intensity.

We extracted the reflectance of the mirrors in our devices by fitting an Airy distribution to the measured reflection spectrum. To create a comparable waveform, we selected the FSR and first $\lambda_0$ from our measurements, and centered the phase shift at the initial resonant wavelength by subtracting it from $\lambda\lambda$ to determine the single-pass phase shift in relation to the resonant wavelength, $2\phi'=2\pi(\lambda-\lambda_0)/\Delta\lambda_{FSR}$. The distribution was also normalized and scaled to the maximum and minimum voltage readings for each device. For the dual-cavity devices, the FSR and initial resonant wavelengths of each cavity were used to calculate two Airy distributions, which were added together, then normalized and scaled to the magnitude of the measured reflection. This showed the ideal response of each device given the measured FSR, resonant wavelength, and magnitude. With this waveform, different values of R were chosen until the magnitude and shape closely resembled the measured response. The value that provided the best match was taken as the reflectance.

Figure 5A:
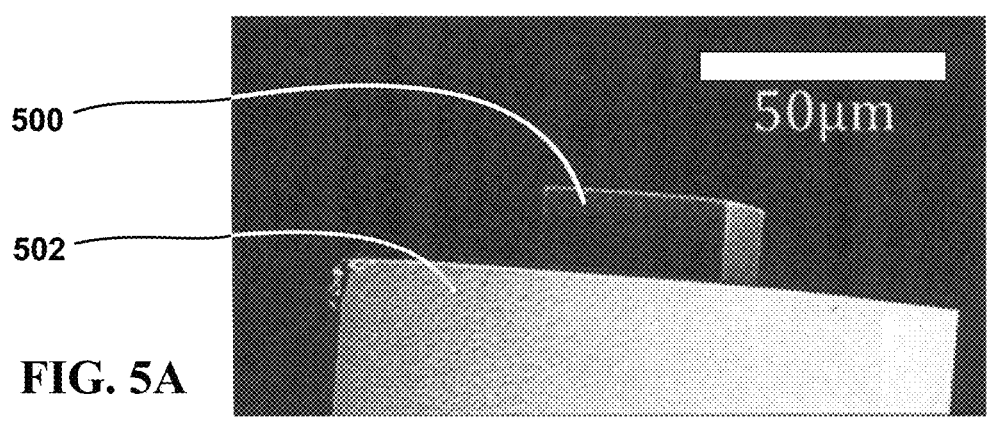
FIG. 5A depicts a scanning electron microscope (SEM) image of a fabricated single-cavity FP device, according to one or more embodiments.
Figure 5B:
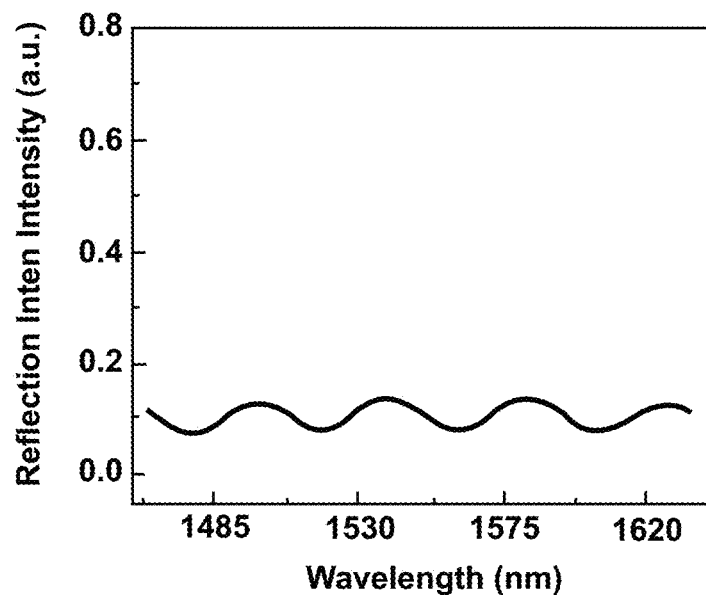
FIG. 5B depicts a graphical plot of measured reflection intensity as a function of wavelength for the fabricated single-cavity FP device of FIG. 5A, according to one or more embodiments.
Figure 5C:
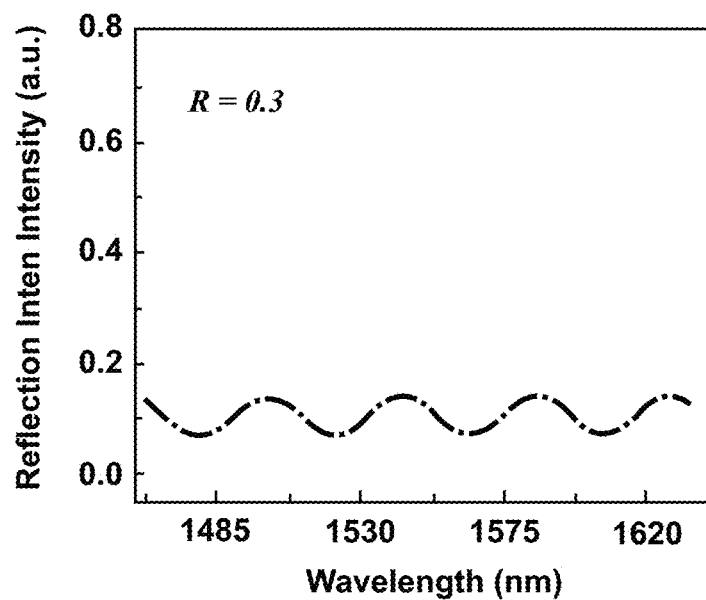
FIG. 5C depicts a graphical plot of an Airy distribution as a function of wavelength for the fabricated single-cavity FP device of FIG. 5A, according to one or more embodiments.

Measurement Results: FIG. 5A depicts a scanning electron microscope (SEM) image of a fabricated single-cavity FP device 500 comprising a 40 µm by 40 µm and 17.58 µm tall rectangle on a cleaved tip of an optical fiber 502. FIG. 5B depicts a graphical plot 530 of measured reflection intensity as a function of wavelength. The cavity was formed by a 17.58 µm long, 40 µm by 40 µm rectangle, resulting in a theoretical FSR of 45.43 nm. The measured average $\Delta\lambda_{FSR}$ was 42.09 nm, showing a variation of only 3.34 nm. The device's high reflection intensity was 19.29 µW corresponding to a voltage of 132.58 mV. The low reflection intensity was 10.17 with a voltage of 69.89 mV, yielding an extinction ratio of 1.90. FIG. 5C depicts a graphical plot 560 of an Airy distribution with R=0.01 as a function of wavelength. Fitting the Airy distribution to these results gave a reflectance of 0.01. This low value was caused by the thicker fiber-polymer interface, as the released devices show significantly higher reflectance. The single-cavity device confirmed that the two-photon polymerization method successfully produced optical elements for planar FP resonators.

Figure 6A:
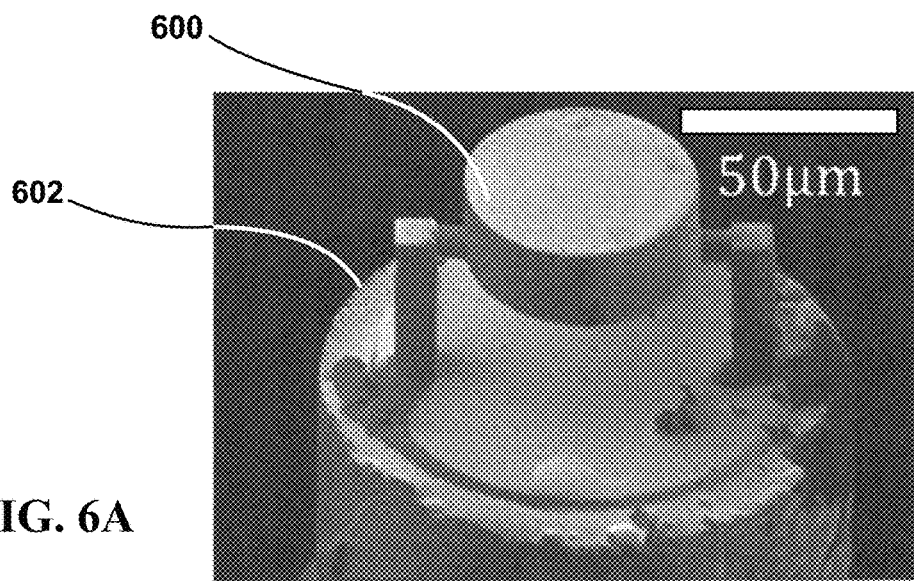
FIG. 6A depicts a SEM image of a fabricated released dual-cavity FP device, according to one or more embodiments.
Figure 6B:
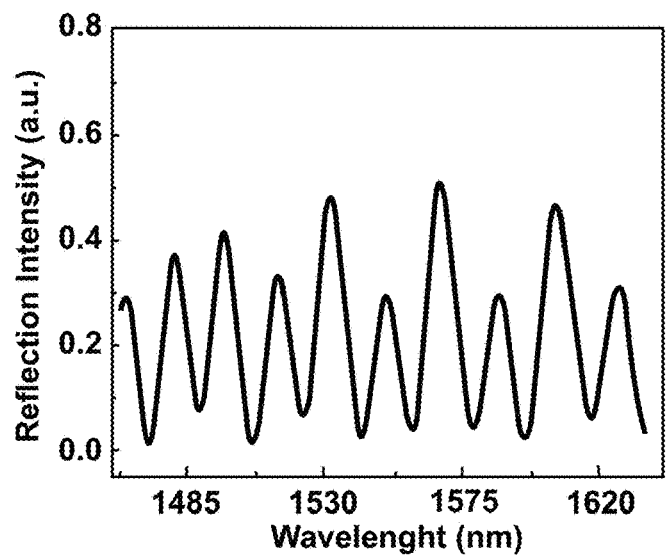
FIG. 6B depicts a graphical plot of measured reflection intensity as a function of wavelength for the released dual-cavity FP device of FIG. 6A, according to one or more embodiments.

FIG. 6A depicts a SEM image of a fabricated dual-cavity FP device 600 formed on a cleaved end of SMF 602. Dual-cavity FP device 600 has a 56 µm diameter, 20 µm tall disk suspended above a 35 µm air cavity. These cavity lengths match the hemispherical device. (b) Measured reflection intensity as a function of wavelength. (c) Airy distribution with R=0.3. The released dual-cavity device represents a significant improvement in functionality over the single-cavity device because its first cavity is open to the environment. FIG. 6B depicts a graphical plot 630 of measured reflection intensity as a function of wavelength. The dual-cavity FP device also improved the extinction ratio of the reflection spectrum. The first cavity was 35 µm tall and filled with air, leading to a theoretical FSR of 34.32 nm.

Figure 6C:
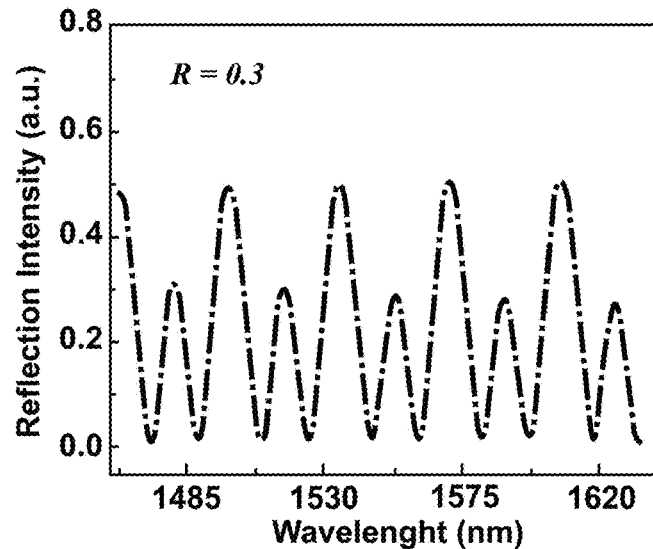
FIG. 6C depicts a graphical plot of an Airy distribution as a function of wavelength for the released dual-cavity FP device of FIG. 6A, according to one or more embodiments.

The polymer cavity was formed by a 56 µm diameter, 20 µm tall disk with a theoretical FSR of 39.94 nm. When measured, the air cavity had an average FSR of 36.24 nm and the polymer cavity had an average FSR of 36.07, agreeing within five nanometers of the theoretical values. The high reflected intensity of this device was 68.24 corresponding to a voltage of 468.98 mV, and the low reflected intensity was 1.12 µW reading a voltage of 7.67 mV. This gives the device an extinction ratio of 61. FIG. 6C depicts a graphical plot 660 of an Airy distribution as a function of wavelength with reflectance R=0.03.

Suspending the polymer structure over an air-gap allows various interstitial media to be introduced into the first cavity. Optofluidic dies, quantum dot suspensions, or other gain media could be inserted to create fiber-tip lasers. The RI of an unknown gas or liquid can also be determined by immersing the dual-cavity device and comparing the shifted FSR to a reference. Furthermore, by including both a solid polymer cavity and an open cavity, an RI sensor with this device would be self-referencing and temperature immune. If a single open cavity sensor was exposed to both a change in temperature and interstitial medium, the FSR of the device would shift due to the new RI of the cavity, and the new cavity length introduced by thermal expansion of the polymer. It would be very difficult to decouple each effect from the observed FSR shift. The released dual-cavity device would be able to isolate a change in RI from the effect of thermal expansion because the solid cavity would only experience the thermal effects. One could determine the thermal effects from the FSR shift in the polymer cavity, calculate the corresponding effects on the open cavity, and subtracting them from the open cavity FSR shift to isolate the changes in the interstitial medium.

While the dual-cavity device enables many applications, there was a risk that the response from one cavity would interfere with the response from another. If the resonant wavelengths are too close and the width of the resonance is too large, different peaks could not be resolved. Furthermore, light reflected from one cavity could destructively interfere with light resonating in another, removing part of the signal. Fortunately, this kind of interference can be avoided by properly designing the constituent optical cavities. Peaks from both cavities are clearly resolvable, as seen in FIG. 6B, and the extinction ratio improved markedly over the single-cavity device. Since the signal quality improved with the addition of the second cavity, interference between the cavities does not seem to degrade the response.

Figure 7A:
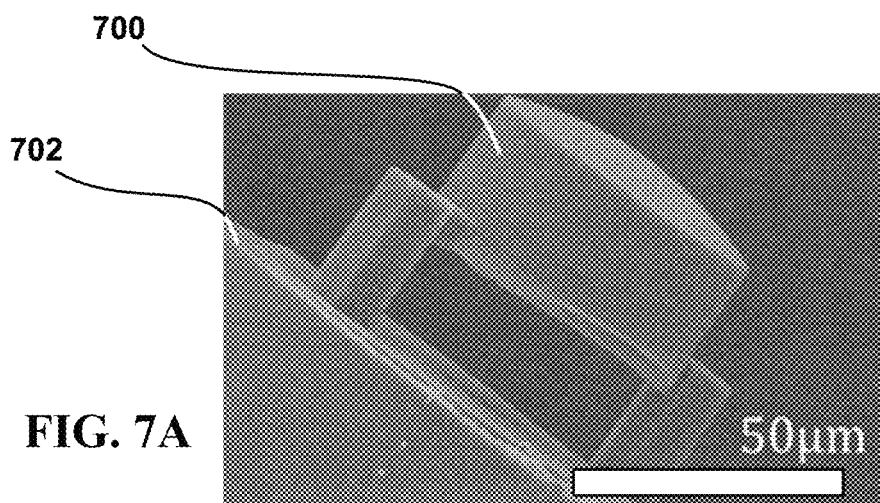
FIG. 7A depicts a SEM image of a fabricated hemispherical dual-cavity FP device, according to one or more embodiments.
Figure 7B:
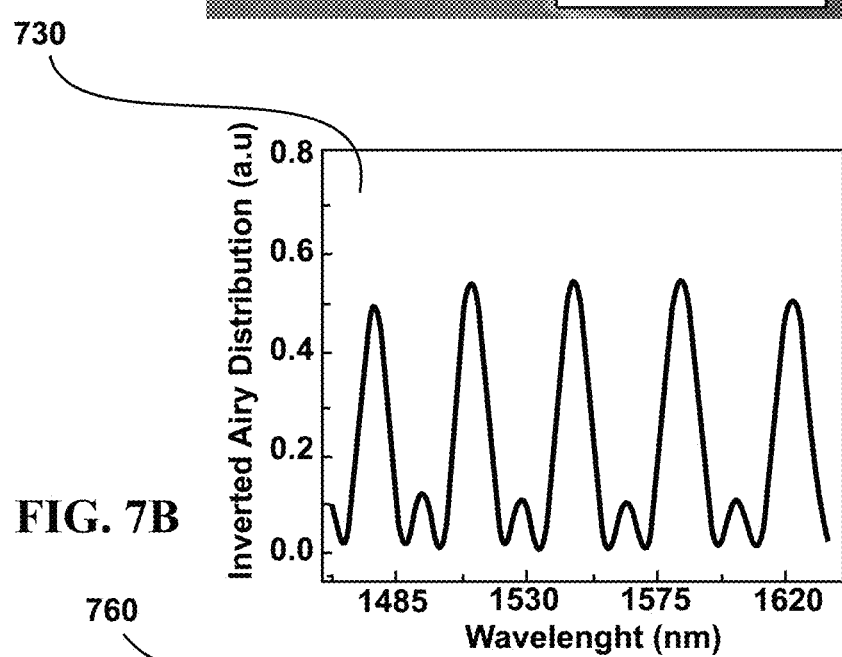
FIG. 7B depicts a graphical plot of measured reflection intensity as a function of wavelength for the hemispherical dual-cavity FP device of FIG. 7A, according to one or more embodiments.
Figure 7C:
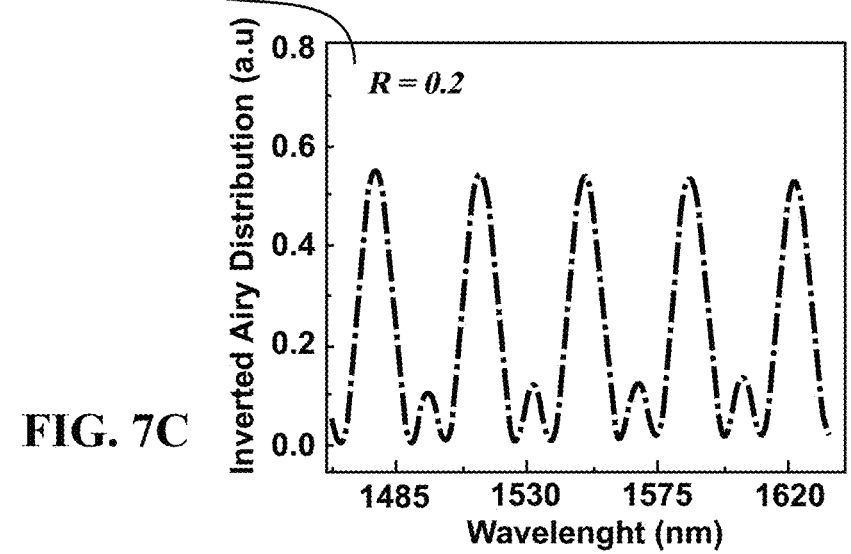
FIG. 7C depicts a graphical plot of an Airy distribution as a function of wavelength for the hemispherical dual-cavity FP device of FIG. 7A, according to one or more embodiments.

FIG. 7A depicts a SEM image of a fabricated hemispherical dual-cavity FP device 700 having a 56 µm diameter, 20 µm tall cylinder measured from each center of curvature. The top mirror has a 75 µm radius and the inner mirror has a 35 µm radius. The center of the inner mirror is suspended 22.5 µm above the face of the fiber. FIG. 7B depicts a graphical plot 730 of measured reflection intensity as a function of wavelength for the hemispherical dual-cavity FP device 700 of FIG. 7A. FIG. 7C depicts a graphical plot 760 of an Airy distribution as a function of wavelength with reflectance R=0.02 for the hemispherical dual-cavity FP device 700 of FIG. 7A.

The hemispherical device enjoys all the utility of the flat dual-cavity device while adding the many benefits of curved mirrors. The hemispherical mirrors reduced diffraction losses and improved lateral confinement to produce a more consistent peak transmission. Within the reflection dips, the flat dual-cavity device showed a variance of 0.53 mV, while the hemispherical counterpart achieved a variance of only 0.026 mV. The hemispherical FP cavity also had the largest extinction ratio observed, with a high reflection intensity of 78.162 µW reading 537.17 mV, and a low reflection intensity of 0.31 µW reading 2.12 mV. This gave the hemispherical device an extinction ratio of 253. An SEM image, and the reflection spectrum of the hemispherical Fabry-Pérot cavity are shown in FIG. 7A and FIG. 7B respectively. The distance between the center of the inner mirror and the face of the fiber was 35 µm, with a theoretical FSR of 34.32 nm. Within the polymer gap, the concave-convex resonator was 20 µm long between centers for a theoretical FSR of 39.94 nm. The FSR of the air cavity was measured to be 36.31 nm, and the FSR of the polymer cavity was measured to be 36.19 nm. The Airy distribution fit the measured response with a reflectance of 0.2. This value is lower than the flat cavity, although the curved mirror reduces losses. The drop is likely caused by the thin polymer feature fabricated over the surface of the fiber. While the feature does not function as intended, as a third curved mirror, the fiber-polymer interface it creates explains the loss in reflectance.

Like all curved-mirror FP cavities, hemispherical resonators are significantly less sensitive to misalignment, making the device more robust in the face of vibrations or impacts to the fiber. In addition, they can be used at higher incident intensities without the loss of resolution that occurs in planar FP cavities. The hemispherical device represents the power of our fabrication technique to utilize 3-D freedom to create advantageous geometries that cannot otherwise be realized.

In conclusion, we have demonstrated three FP resonator designs fabricated directly onto the cleaved ends of low-loss optical fibers. Our fabrication technique is simple, fast, and enables true 3-D freedom to realize complex features, such as optical elements, which are difficult or impossible to create with traditional microfabrication methods. Two-photon polymerization with ultra-fast laser pulses creates devices on fiber tips in less than 15 minutes with a single writing step. Each device improved the quality of the FP cavity's reflection response. The single-cavity featured an extinction ratio of 1.90, the released dual planar cavity device obtained an extinction ratio of 61, and the hemispherical cavity device obtained an extinction ratio of 253. The reflectance of the direct fiber-polymer interface was estimated to be 0.01, while the reflectance of IP-DIP was estimated to be between 0.2 and 0.3, both over 1463 nm to 1634 nm. The dual-cavity device promises increased utility as the open cavity is able to interact with its environment and reference changes in RI to the solid cavity. The hemispherical device brings the benefits of a curved-mirror FP resonator such as improved alignment insensitivity and constant resolution at increased intensity, while also providing a consistent resonant intensity across the spectrum of interest.

These FP cavity devices invite numerous applications, such as on-fiber lasers and various sensors. Our future work specifically hopes to explore reflective coatings to improve the reflectance and quality factor of the reflection spectrum. Micron scale plano and hemispherical cavities with have demonstrated quality factors as high as 105 by adding a reflective coating, [2] and the next devices we are producing aim to achieve a reflectance of 0.9 or higher. The speed of our fabrication process enables us to take an iterative design approach and explore several reflective coating options. A more reflective FP cavity will have much higher resolution and produce measurable responses for small changes in the RI or length of the cavity to detect different phenomena such as electromagnetic radiations, acoustic waves, temperature and pressure changes, displacements, and hazardous material concentrations in both gas and liquid form. Future work includes determining the suitability of the next generation devices to sense some of these phenomena.

Figure 8:
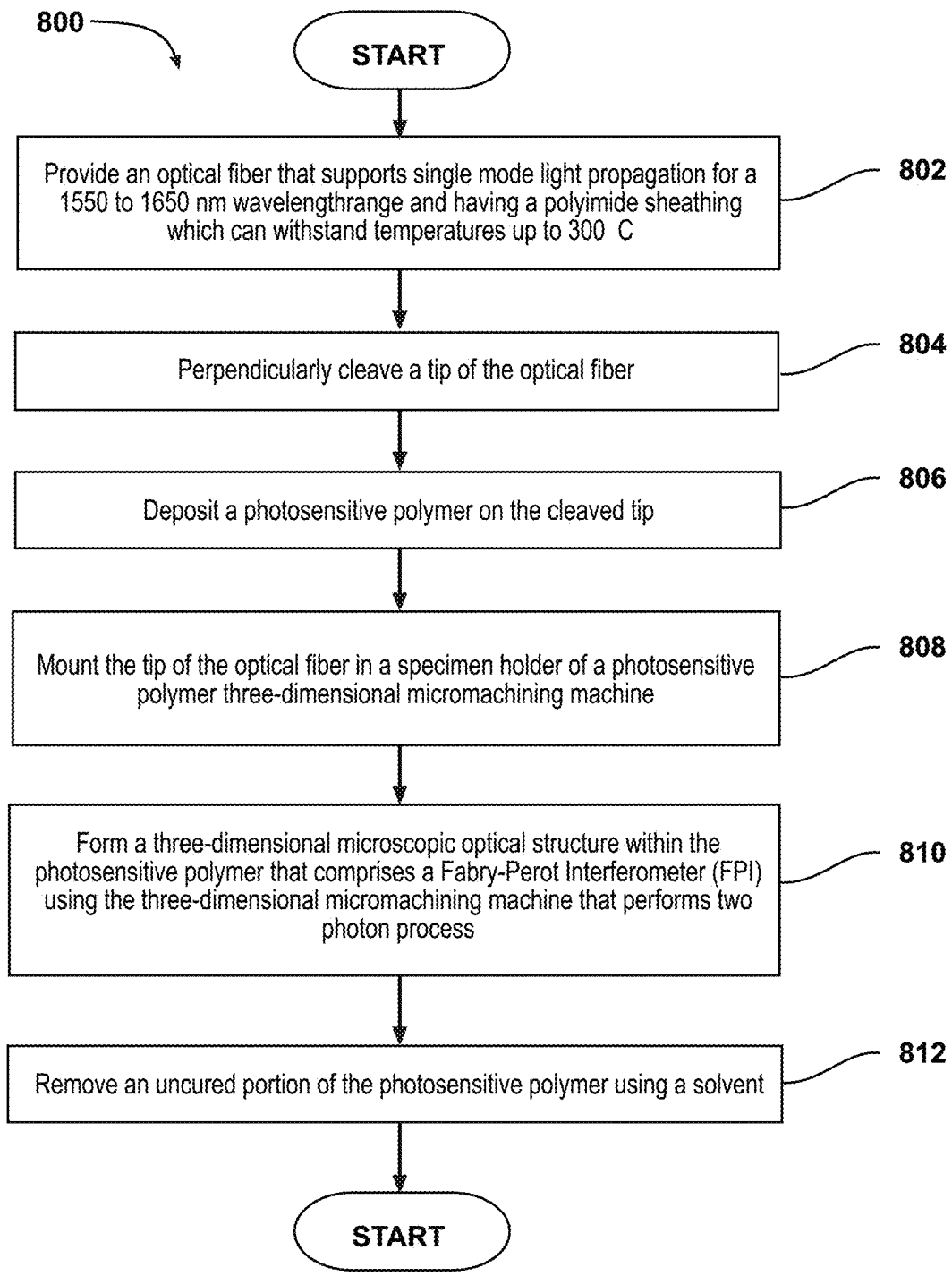
FIG. 8 depicts a flow diagram of a method for fabricating a passive optical sensor on a tip of an optical fiber, according to one or more embodiments.

FIG. 8 depicts a flow diagram of a method 800 for fabricating a passive optical sensor on a tip of an optical fiber. Method 800 includes providing an optical fiber that supports single mode light propagation for a 1550 to 1650 nm wavelength range and having a polyimide sheathing which can withstand temperatures up to 300° C. (block 802). Method 800 includes perpendicularly cleaving a tip of the optical fiber (block 804). Method 800 includes depositing a photosensitive polymer on the cleaved tip (block 806). Method 800 includes mounting the tip of the optical fiber in a specimen holder of a photosensitive polymer three-dimensional micromachining machine (block 808). In one or more embodiments, method 800 includes mounting the tip of the optical fiber in the specimen holder by attaching a fiber chuck over a semiconductor wafer opening in a specimen tray. Method 800 includes forming a three-dimensional microscopic optical structure within the photosensitive polymer that comprises a Fabry-Perot Interferometer (FPI) using the three-dimensional micromachining machine that performs two photon process (block 810). Method 800 includes removing an uncured portion of the photosensitive polymer using a solvent (block 812). In one or more embodiments, method 800 includes forming the three-dimensional microscopic optical structure by forming a layer of polymer that acts as a single cavity FPI that reflects a light signal back through the optical fiber, the reflected light altered by refractive index changes in the three-dimensional structure that is subject to at least one of: (i) thermal radiation; and (ii) volatile organic compounds. In one or more embodiments, method 800 includes forming the three-dimensional microscopic optical structure by forming a suspended layer of polymer providing three flat interfaces that act as a two cavity FPI. In one or more embodiments, method 800 includes forming the three-dimensional microscopic optical structure by forming a suspended layer of polymer having double confocal surfaces that act as a two cavity FPI. Then method 800 ends.

The following references cited above are hereby incorporated by reference in their entirety:

[1] X. Wu, Y. Wang, Q. Chen, Y.-C. Chen, X. Li, L. Tong, and X. Fan, Photonics Res. 7, 50-60 (2018).
[2] X. Wu, Q. Chen, Y. Wang, X. Tan, and X. Fan, ACS Photonics 6, 2470-2478 (2019). [3] W. Wang, C. Zhou, T. Zhang, J. Chen, S. Liu, and X. Fan, Lab Chip 15, 3862-3869 (2015).
[4] C. Toninelli, Y. Delley, T. Stoferle, A. Renn, S. Gotzinger, and V. Sandaghdar, Appl. Phys. Lett. 97, 021107 (2010).
[5] D Hunger, C. Deutsch, R. J. Barbour, R. J. Warburton, and J. Reichel AIP Adv. 2, 012119 (2012).
[6] Y. C. chen, Q. Chen, T. Zhang, W. Wang, and X. Fan, Lab Chip 17, 538-548 (2017).
[7] X. Duan, Y. Huang, R. Agarwal, C. M. Lieber, Nature 421, 241-244 (2003).
[8] H. Cai, B. Liu, X. M. Zhang, A. Q. Liu, J. Tamil, T. Bourouina, and Q. X. Zhang, Opt. Express 16, 16670-16679 (2008).
[9] J. Masson, R. St-Gelais, A. Poulin, and Y. A. Peter, IEEE J. Quantum Electron. 46, 1313-1319 (2010).
[10] B. Saadany, M. Malak, M. Kubota, F. Marty, Y. Mita, D. Khalil, and T. Bourauina, IEEE J. Quantum Electron. 12, 1480-1488 (2006).
[11] R. St-Gelais, J. Masson, Y. A. Peter, Appl. Phys. Lett. 94, 243905 (2009).
[12] M. J. Thorpe, D. Balslev-Clausen, M. S. Kirchner, J. Ye, Opt. Express 16, 2387-2397 (2008).
[13] W. Z. Song, X. M. Zhang, A. Q. Liu, C. S. Lim, P. H. Yap, H. M. M. Hosseini, Appl. Phys. Lett. 89, 203901 (2006).
[14] M. Pisani and M. Zucco, Opt. Express 17, 8319-8331 (2009).
[15] E. Snijders, J. A. Frey, J. Norman, V. P. Post, A. C. Gossard, J. E. Bowers, M. P. van Exter, W. Loffler, and D. Bouwmeester, Phys. Rev. Appl. 9, 031002 (2018).
[16] Y. Colombe, T. Steinmetz, G. Dubois, F. Linke, D. Hunger, and J. Reichel, Nature 450, 272-276 (2007).
[17] S. Garcia, F. Ferri, K. Ott, J. Reichel, and R. Long, Opt. Express 26, 22249-22263 (2018).
[18] M. Uphoff, M. Brekenfeld, G. Rempe, and S. Ritter, New J. Phys. 17, 013053 (2015).
[19] S. Wise, G. Mueller, D. Reitze, D. B. Tanner, and B. F. Whiting, Class. Quantum Gray. 21, S1031-S1036 (2004).
[20] K. Zandi, J. A. Belanger, and Y. A. Peter, J. Microelectromech. Syst. 21, 1464-1470 (2012).
[21] M. Yao, X. Ouyang, J. Wu, A. P. Zhang, H. Y. Tam, and P. K. A. Wai, Sensors 18, 1825 (2018).
[22] J. L. Kou, J. Feng, L. Ye, F. Xu, and Y. Q. Lu, Opt. Express 18, 14245-14250 (2010).
[23] X. Liu, I. I. Iordachita, X. He, R. H. Taylor, and J. U. Kang, Biomed. Opt. Express 3, 1062-1076 (2012).
[24] M. Quan, J. Tian, Y. Yao, Opt. Lett. 40, 4891-4894 (2015).
[25] G. Aubry, Q. ou, J. Soto-Velasco, C. Wang, S. Meance, J. J. He, and A. M. Haghiri-Gosnet, Appl. Phys. Lett. 98, 111111 (2011).
[26] C.-Y. Gong, Y. Gong, W.-L. Zhang, Y. Wu, Y.-J. Rao, G.-D. Peng, and X. Fan, J. Sel. Topics Quantum Electron. 24, 0900206 (2008).
[27] J. W. Smith, J. S. Suelzer, N. G. Usechak, V. P. Tondiglia, and H. Chandrahalim, "3-D thermal radiation sensors on optical fiber tips fabricated using ultrashort laser pulses," in Proceedings of International Conference on Solid-State Sensors, Actuators and Microsystems & Eurosensors XXXIII (IEEE, 2019), pp. 649-652.
[28] K.-S. Lee, R. H. Kim, D.-Y. Yang, and S. H. Park, Prog. Polym. Sci. 33, 631 (2008).
[29] N. Ismail, C. C. Kores, D. Geskus, and M. Pollnau, Optics Express 24, 16366 (2016).

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A passive microscopic Fabry-Perot Interferometer (FPI) sensor comprising:
    an optical fiber; and
    a three-dimensional microscopic optical structure formed on a cleaved tip of the optical fiber that reflects a light signal back through the optical fiber, the reflected light altered by refractive index changes in the three-dimensional structure that is subject to at least one of: (i) thermal radiation; and (ii) volatile organic compounds, wherein the three-dimensional microscopic optical structure comprises a suspended layer of polymer providing three flat interfaces that act as a two cavity FPI.

2. The passive microscopic FPI sensor of claim 1, wherein the three-dimensional microscopic optical structure is formed by photosensitive polymer three-dimensional micromachining device that performs a two-photon polymerization process.

3. The passive microscopic FPI sensor of claim 1, wherein the three-dimensional microscopic optical structure comprises a layer of polymer that acts as a single cavity FPI.

4. The passive microscopic FPI sensor of claim 1, wherein the optical fiber supports single mode light propagation for a 1550 to 1650 nm wavelength range and has a polyimide sheathing which can withstand temperatures up to 300° C.

\* \* \* \* \*